United States Patent [19]
Thompson

[11] Patent Number: 5,898,844
[45] Date of Patent: Apr. 27, 1999

[54] DATA PROCESSING SYSTEM INCLUDING A HOT-PLUG CIRCUIT FOR RECEIVING HIGH-POWER ADAPTOR CARDS

[75] Inventor: Guy Alan Thompson, Tucson, Ariz.

[73] Assignee: International Business Machines Corporation, Armonk, N.Y.

[21] Appl. No.: 08/710,284

[22] Filed: Sep. 13, 1996

[51] Int. Cl.$^6$ .................................................. G06F 13/00
[52] U.S. Cl. ......................... 395/283; 395/280; 395/284; 361/58; 365/149
[58] Field of Search ..................... 395/283, 280; 361/58; 307/463; 323/284; 327/412; 365/149

[56] References Cited

U.S. PATENT DOCUMENTS

| | | | |
|---|---|---|---|
| 5,079,455 | 1/1992 | McCafferty et al. | 307/568 |
| 5,109,167 | 4/1992 | Montegari | 307/463 |
| 5,268,592 | 12/1993 | Bellamy et al. | 307/43 |
| 5,272,584 | 12/1993 | Austruy et al. | 361/58 |
| 5,283,707 | 2/1994 | Conners et al. | 361/58 |
| 5,376,831 | 12/1994 | Chen | 327/379 |
| 5,473,499 | 12/1995 | Weir | 361/58 |
| 5,559,423 | 9/1996 | Harman | 323/277 |
| 5,559,660 | 9/1996 | Watson et al. | 361/58 |
| 5,572,395 | 11/1996 | Rasums et al. | 361/58 |
| 5,712,754 | 1/1998 | Sides et al. | 361/58 |
| 5,793,987 | 8/1998 | Quackenbush et al. | 395/280 |

FOREIGN PATENT DOCUMENTS

| | | |
|---|---|---|
| 0661643A1 | 5/1995 | European Pat. Off. . |
| 6-161606 | 6/1994 | Japan . |

OTHER PUBLICATIONS

IBM Technical Disclosure Bulletin, vol. 32, No. 5B—Oct. 1989, "Slow Start Circuit".

IBM Technical Disclosure Bulletin, vol. 34, No. 4A—Sep. 1991, "Hot–Plug Circuit".

*Primary Examiner*—Ayaz R. Sheikh
*Assistant Examiner*—Eric S. Thlang
*Attorney, Agent, or Firm*—Robert M. Sullivan; Antony P. Ng; Andrew J. Dillon

[57] ABSTRACT

A hot-plug circuit for receiving a high-current load is disclosed. In accordance with a preferred embodiment of the present invention, the hot-plug circuit comprises a transistor, a capacitor, a resistor, and a control circuit module. The transistor is coupled between a power supply and an input that is adapted to receive the high-power adaptor card. The capacitor is coupled between a first terminal and a second terminal of the transistor. The resistor is coupled to the first terminal of the transistor. Finally, the control circuit module is for applying a first bias voltage to the second terminal of the transistor via the resistor in order to turn the transistor off during an absence of the high-current load, and for applying a second bias voltage to the second terminal of the transistor via the resistor in order to turn the transistor on under a linear conduction mode upon an initial contact of said high-current load to the input. As such, voltage dropouts and noise transients from the hot-plugging of a high-power load are minimized.

14 Claims, 5 Drawing Sheets

DATA PROCESSING SYSTEM INCLUDING A HOT-PLUG CIRCUIT FOR RECEIVING HIGH-POWER ADAPTOR CARDS

BACKGROUND OF THE INVENTION

1. Technical Field

The present invention relates to a circuit for limiting current surges in general and, in particular, to a circuit for limiting current surges during hot-plugging of an adaptor card within a computer system. Still more particularly, the present invention relates to a circuit for eliminating voltage dropouts and noise transients during hot-plugging of a high-power adaptor card within a computer system.

2. Description of the Prior Art

For a computer system that is required to be in operation 24 hours a day, 365 days a year, it is imperative that any service or modification to the system can be performed in a non-disruptive manner so that the system can continue to function without any interruption. Thus, the removal and installation of various adaptor cards to the system, each having its own set of functions, from and to a respective card slot of the system are often performed under a procedure known as "hot-plugging" or "hot-swapping."

Hot-plugging allows for system serviceability or expandability without requiring an entire shutdown of the system; however, hot-plugging also exposes a powered-up system to various potential hazards. A common hazard is the generation of voltage transients on DC power supplies due to an abrupt change in load from the insertion of an adaptor card that has a high-power requirement. Momentary voltage dropouts and noise spikes can cause errors to occur in any device that shares a common power bus. Further, sudden surge currents, nearly equivalent to a short circuit, can overwhelm the power supply regulation and distribution unit of the system, which will result in power dropouts to active logic cards.

One solution to this problem would be to design the computer system to have an independent power control unit or regulator at each adaptor card slot. However, this solution seems to be wastefully expensive because a spike-avoidance device or a power control unit is required for each adaptor card slot, regardless of whether or not the adaptor card slot is currently utilized. In addition, the probability of component failure also increases accordingly as the total number of components within the system increases. Furthermore, because the system is always ready to power up adaptor cards which may never be inserted, thus this solution may also be a waste of electricity.

Consequently, it would be desirable to provide an improved circuit for minimizing or eliminating voltage dropouts and noise transients during the hot-plugging of a high-power adaptor card.

SUMMARY OF THE INVENTION

In view of the foregoing, it is therefore an object of the present disclosure to provide an improved circuit for limiting current surges.

It is another object of the present disclosure to provide an improved circuit for limiting current surges during hot-plugging of an adaptor card within a computer system.

It is yet another object of the present disclosure to provide an improved circuit for eliminating voltage dropouts and noise transients during hot-plugging of a high-power adaptor card within a computer system.

In accordance with a preferred embodiment of the present invention, the circuit comprises a transistor, a capacitor, a resistor, and a control circuit module. The transistor is coupled between a power supply and an input that is adapted to receive the high-power adaptor card. The capacitor is coupled between a first terminal and a second terminal of the transistor. The resistor is coupled to the first terminal of the transistor. Finally, the control circuit module is utilized to apply a first bias voltage to the second terminal of the transistor via the resistor in order to turn the transistor off during an absence of the high-current load, and for applying a second bias voltage to the second terminal of the transistor via the resistor in order to turn the transistor on under a linear conduction mode upon an initial contact of said high-current load to the input. As such, voltage dropouts and noise transients from the hot-plugging of a high-power load are minimized.

All objects, features, and advantages of the present disclosure will become apparent in the following detailed written description.

BRIEF DESCRIPTION OF THE DRAWINGS

The disclosure itself, as well as an illustrative mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The hot-plug circuit as described in the present invention is designed to be implemented within a card slot of a computer system for receiving an adaptor card. However, it is understood that the features of the hot-plug circuit according to the present invention may be applicable to any application in which a hot-plug circuit is required.

Figure 1:
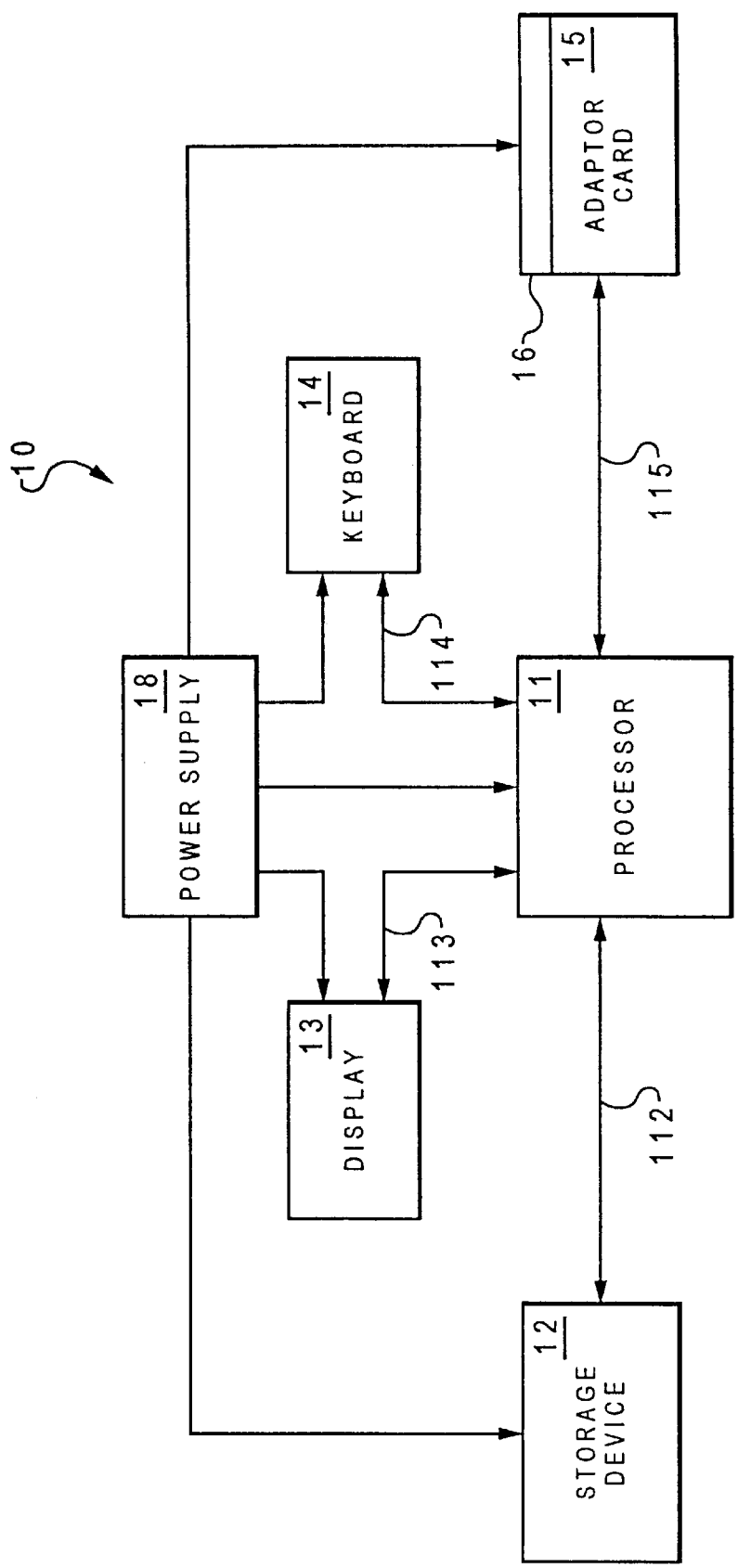
FIG. 1 is a block diagram of a data-processing system which may utilize the present invention.

Referring now to FIG. 1, there is illustrated a block diagram of a data-processing system 10 which may utilize the present invention. As shown, a processor 11 is coupled to a storage device 12, a display 13, a keyboard 14, and an adaptor card 15 through connections 112, 113, 114, and 115 respectively. In addition, adaptor card 15 is coupled to card slot 16 such that a power supply 18 is applying electrical energy to adaptor card 15. Power supply 18 also supplies electrical energy to processor 11, storage device 12, display 13, and keyboard 14.

Figure 2:
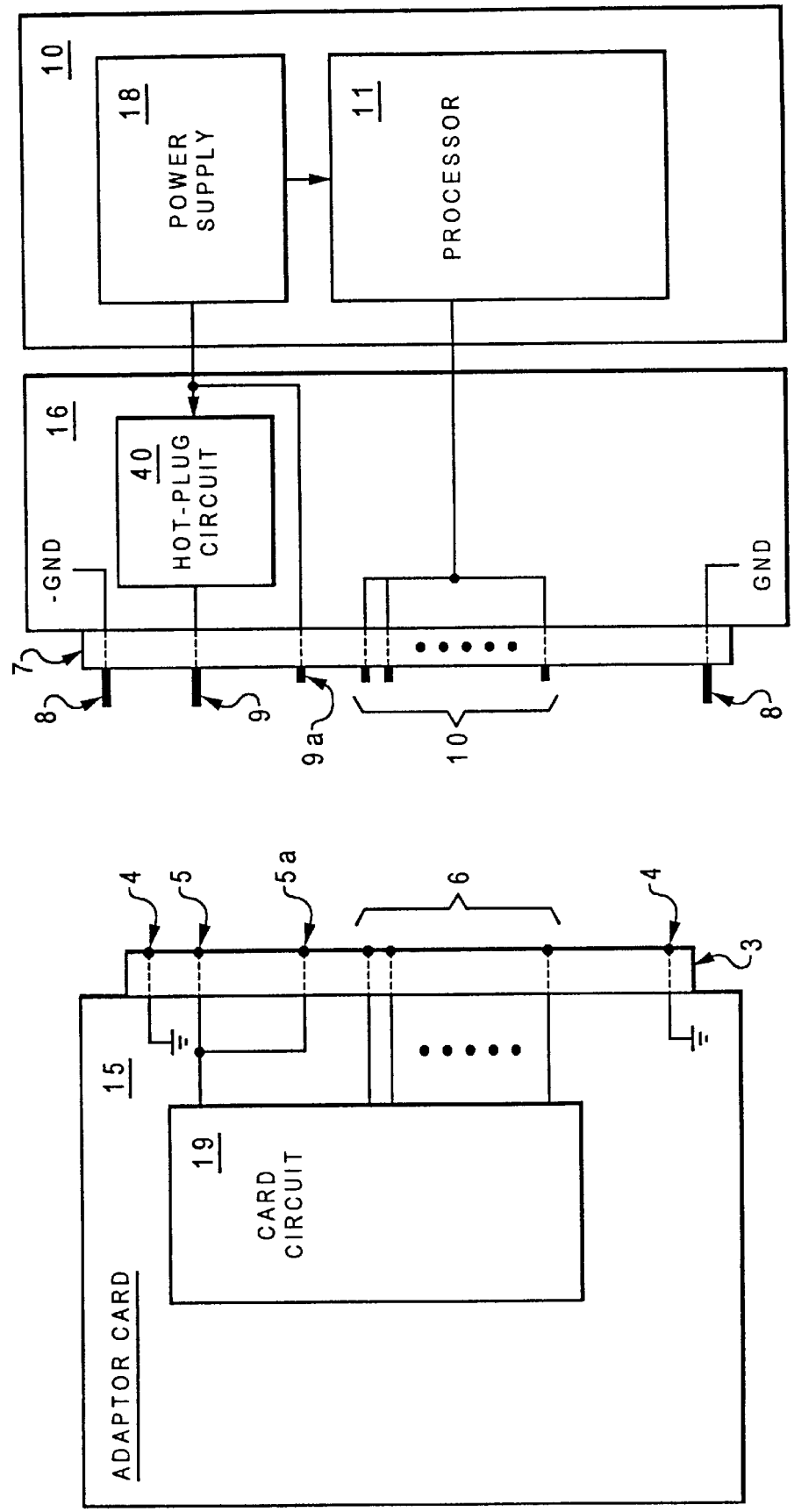
FIG. 2 is a diagram of card slot for providing power supply voltages to an adaptor card.

With reference now to FIG. 2, there is depicted a diagram of card slot 16 for providing supply voltages to adaptor card 15 through connectors 3 and 7. For the sake of simplicity, only power supply 18 and processor 11 are shown within data-processing system 10. Power supply 18 provides a voltage at supply pin 9 within connector 7 of card slot 16 via a hot-plug circuit 40 according to a preferred embodiment of the invention.

Typically, connector 7 of card slot 16 comprises pins while connector 3 of adaptor card 15 comprises pin receivers. Hence, adaptor card 15 can be coupled to card slot 16 by means of connector 3, which includes ground pin receivers 4, supply pin receivers 5, 5a, and signal pin receivers 6, plugging into connector 7, which includes ground pins, supply pins 9, 9a, and signal pins 10. As shown, ground pins 8 and supply pin 9 are preferably longer than supply pin 9a and signal pins 10. Thus, when connector 3 is plugged towards connector 7, the ground and the supply voltage are initially applied to card circuit 19 on adaptor card 15 through ground pins 8 and supply pin 9, respectively, before supply pin 9a or any signal pins 10 comes into contact with supply pin receiver 5a or signal pin receivers 8.

Figure 3:
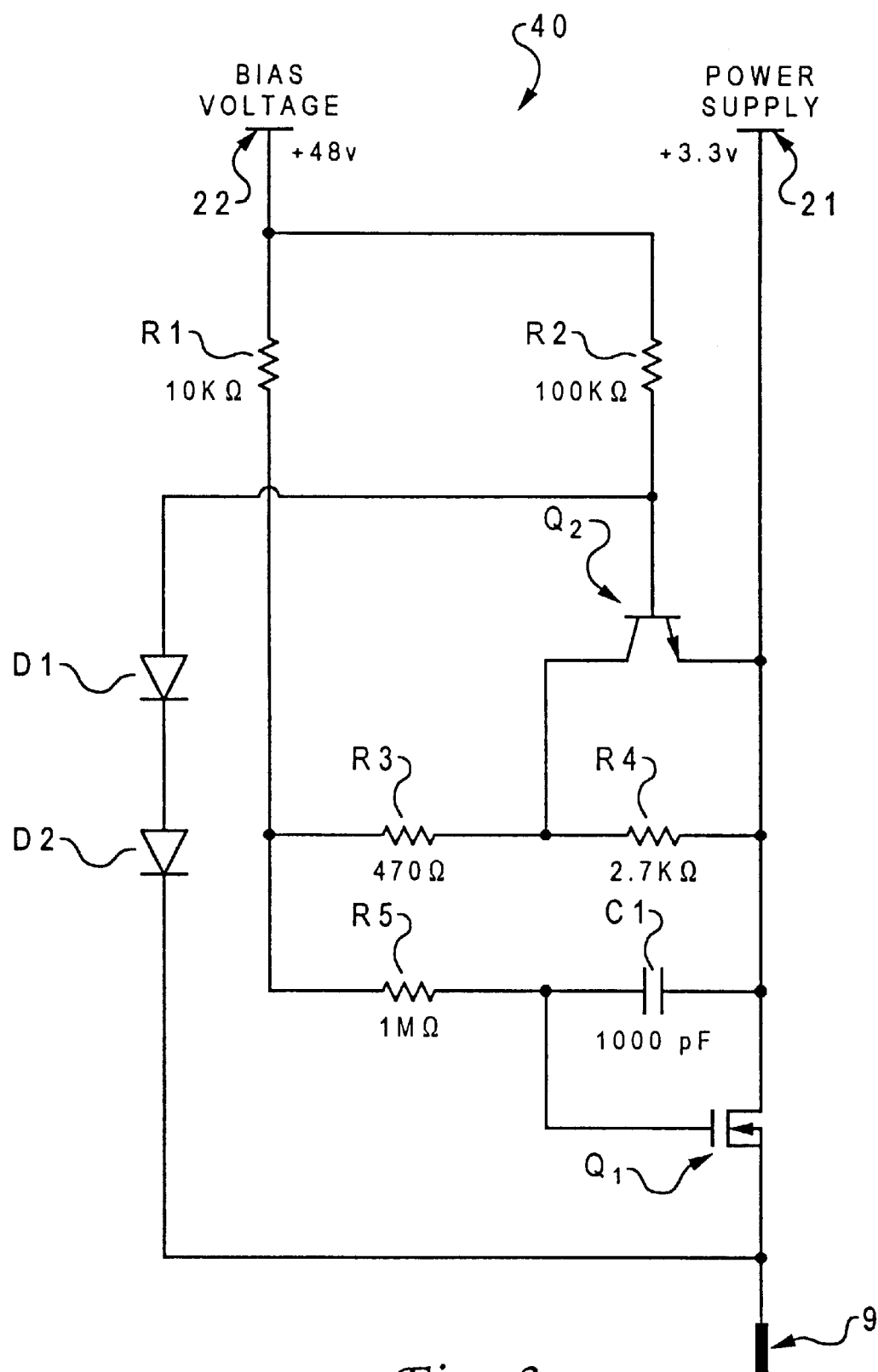
FIG. 3 is a schematic diagram of a hot-plug circuit, according to a preferred embodiment of the invention, for eliminating voltage dropouts and noise transients during hot-plugging of an adaptor card.

Referring now to FIG. 3, there is illustrated a schematic diagram of hot-plug circuit 40 for eliminating voltage drop-outs and noise transients during the hot-plugging of adaptor card 15, according to a preferred embodiment of the invention. Hot-plug circuit 40 requires two connections from the backplane—a connection 21 to power supply 18 and a connection 22 to a bias voltage of at least 10 volts higher than the output voltage of power supply 18. A simple supply voltage multiplier circuit may be utilized to create the required bias voltage in applications where higher voltage is not normally available. Such a voltage multiplier circuit is well-known to those skilled in the art of circuit design. As an example for illustrating the present invention, the output voltage for power supply 18 is selected to +3.3 volts while the bias voltage is selected to be +48 volts. Supply pin 9 (along with ground pins 8, as described above) is the first point of contact for card circuit 19 to data-processing system 10 during the insertion of adaptor card 15 to card slot 16.

Connection 21 is coupled to supply pin 9 via an n-channel MOSFET Q1. A capacitor C1 is connected between the gate and the drain of MOSFET Q1. There are two main resistive paths coming out from connection 22. The first path is through a resistor R2 and leads to the base of an NPN transistor Q2. The second path is through a resistor R1, a resistor R3, a resistor R4, all in series, and lead to connection 21. In addition, a resistor R5 is connected from the node between resistor R1 and resistor R3 to the gate of a MOSFET Q1. The base of transistor Q2 is also connected to supply pin 9 through a diode D1 and a diode D2. The emitter of transistor Q2 is connected to connection 21 while the collector of transistor Q2 is connected to the node between resistor R3 and resistor R4. A preferred value for each component is as follows: resistor R1=10 KΩ, resistor R2=100 KΩ, resistor R3=470 Ω, resistor R4=2.7 KΩ, resistor R5=1 MΩ, and capacitor C1=1000 pF.

Before adaptor card 15 comes into contact with card slot 16, power supply 18 at the backplane is energized and supply pin 9 is floating. At this point, transistor Q2 is forced into saturation due to the voltage at the base of transistor Q2 is approximately equal to +4.0 volts while the voltage at the emitter is approximately equal to +3.3 volts. This creates a voltage divider with series resistors R1 and R3 and establishes a voltage of approximately +5.3 volts (3.3 V+(48 V−3.3 V)*470 Ω/(10 KΩ+470 Ω), assuming $V_{CE}$ at saturation equals to 0 V) at the gate of MOSFET Q1, via resistor R5. The values for resistors R1 and R3 are chosen to set the gate voltage of MOSFET Q1 to just below a conduction mode of MOSFET Q1 under a no-load condition. In this case, the values of resistors R1 and R3 are 10 KΩ and 470 Ω, respectively. Hence, MOSFET Q1 is turned off and is in a high-impedance state.

Upon an initial contact of pin receiver 5 of adaptor card 15 at supply pin 9, the source of MOSFET Q1 is abruptly pulled to the ground. (For better result, pin receivers 4—ground contact of adaptor card 15—should be established before pin receiver 5—power contact—by the usage of even longer ground pins 8.) This occurs because all decoupling capacitors within adaptor card 15 are discharged with zero volt. Thus, diode D1 and diode D2 force the base of transistor Q2 to fall below +3.3 volts, causing transistor Q2 to be off. This allows resistor R4 to be in series with resistors R1 and R3, thus increasing the voltage at the node between resistors R1 and R3 to approximately +14 volts (3.3 V+(48 V−3.3 V)*(470 Ω+2.7 KΩ)/(10 KΩ+470 Ω+2.7 KΩ)). In turn, the gate voltage of MOSFET Q1 rises and MOSFET Q1 begins to conduct in a linear mode of operation. This increase of gate voltage to approximately +14 volts is governed by an R-C time constant established by resistor R5 and capacitor C1 in parallel with the intrinsic gate capacitance of MOSFET Q1.

As the voltage of adaptor card 15 and the voltage at the source of MOSFET Q1 is approaching +3 volts, diodes D1 and D2 will allow transistor Q2 to begin to turn on. Transistor Q2 then begins to shunt current around resistor R4 which, in turn, decreases the voltage at the gate of MOSFET Q1. The resulting voltage of adaptor card 15 stabilizes at a voltage of about +3 volts due to this feedback condition. The degree of offset depends upon the voltage drop across diodes D1 and D2, and also on the drain-source current and resistance of MOSFET Q1. Diodes D1 and D2 could be replaced with other devices in order to minimize this card supply voltage offset; however, enough negative feedback is required to allow hot-plug circuit 40 to reset when adaptor card 15 is removed.

Figure 4:
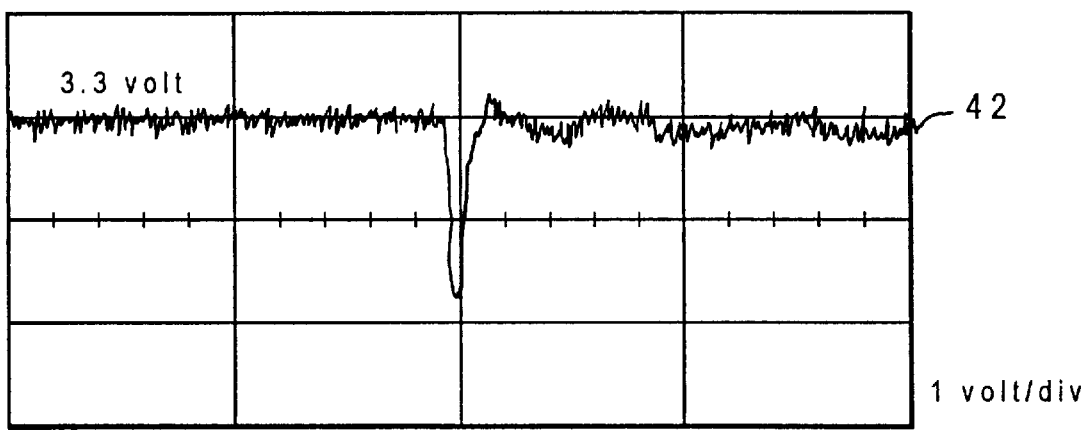
FIG. 4 is a pair of waveforms taken at the time when an adaptor card is being inserted into a card slot having no hot-plug circuit.
Figure 4:
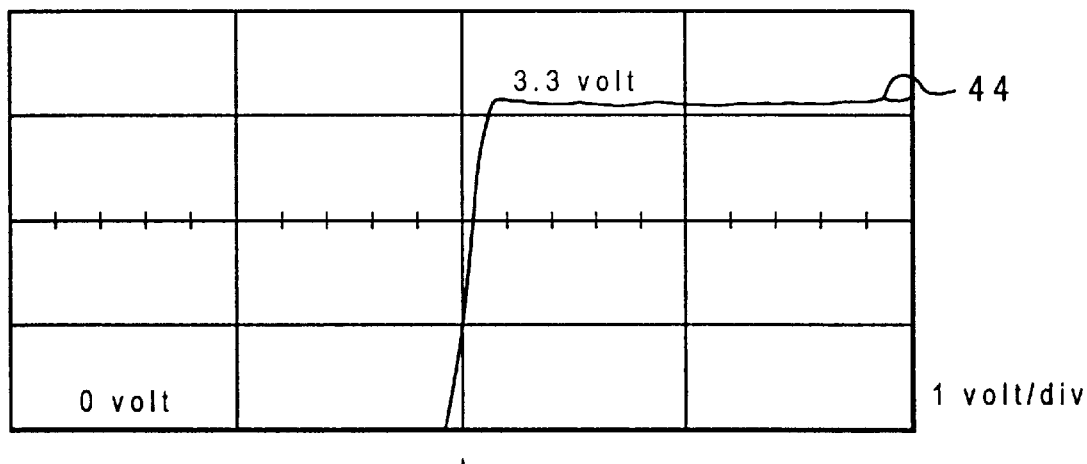

With reference now to FIG. 4, there is illustrated a pair of waveforms at the time when adaptor card 15 is being inserted into a card slot 16 having no hot-plug circuit. Voltage waveform 44 shows the voltage at the supply pin receiver of the adaptor card, and voltage waveform 42 shows the voltage at the backplane where the power supply of the computer system is connected. The sharp rise portion of voltage waveform 44 from 0 volt to 3.3 volts occurs at the point of card insertion. At the same time, there is a corresponding voltage drop for voltage waveform 42. Without the protection of a hot-plug circuit, the voltage drop of waveform 42 can exceed more than 2 volts. Such voltage disturbance may potentially affect the logic state of any device that shares the same power bus.

Figure 5:
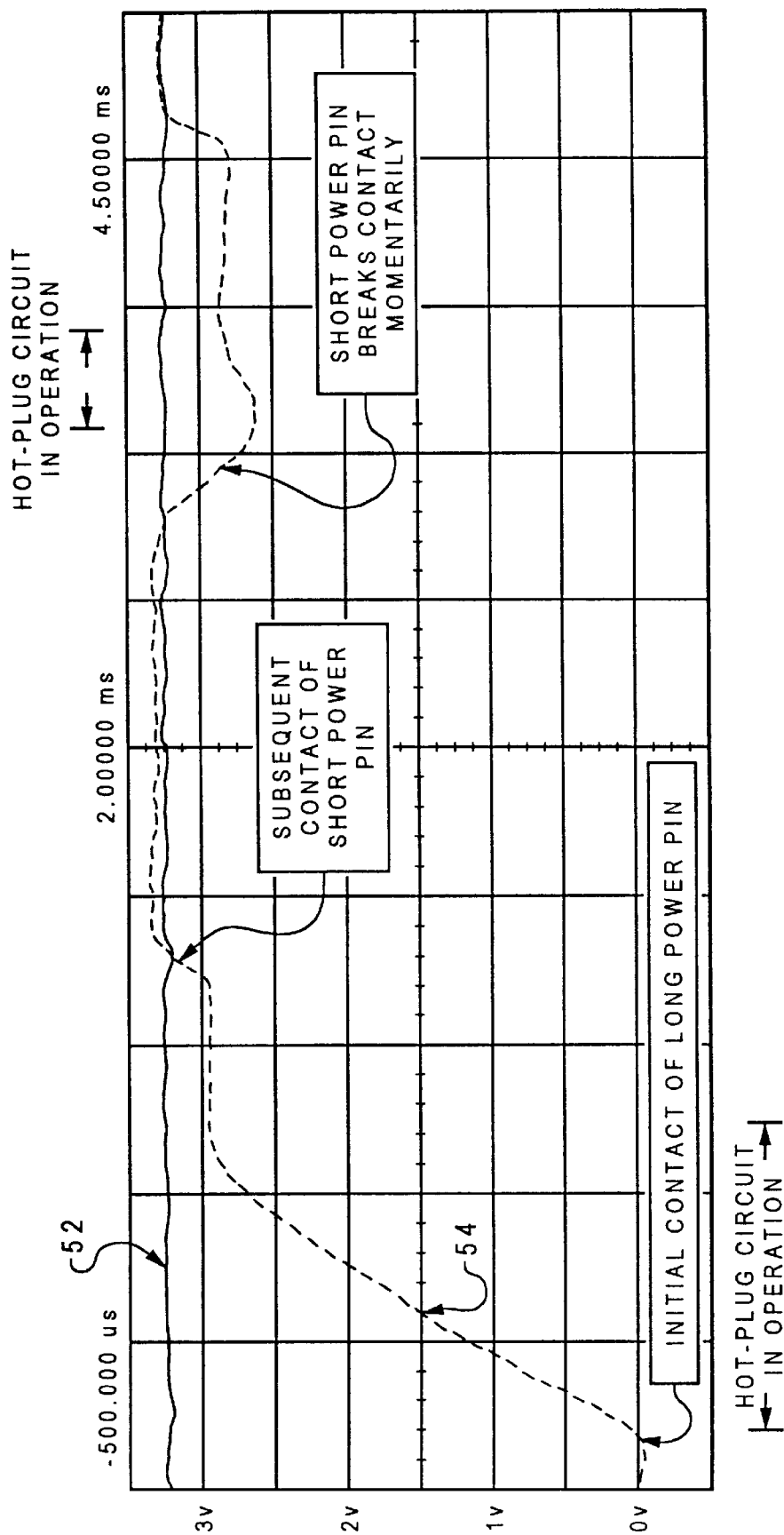
FIG. 5 is a pair of waveforms taken at the time when an adaptor card is being inserted into a card slot having a hot-plug circuit in accordance with a preferred embodiment of the invention.

Referring now to FIG. 5, there is depicted a pair of waveforms at the time when adaptor card 15 is being inserted into a card slot 16 having a hot-plug circuit in accordance with a preferred embodiment of the invention. Voltage waveform 54 shows the voltage at the supply pin receiver of the adaptor card, and voltage waveform 52 shows the voltage at the backplane where the power supply of the computer system is connected.

After t=0, indicated by the initial contact of the long power pin dedicated to the hot-plug circuit, waveform 54 (adaptor card voltage) immediately begins to rise with a time constant defined by resistor R5 and capacitor C1 of the hot-plug circuit. During this time, the adaptor card load is charging and the current supplied to the adaptor card is limited by MOSFET Q1. At about t=4 msec, the adaptor card voltage reaches an equilibrium steady-state condition of approximately 3 volts. MOSFET Q1 is supplying all the load current until the short power pin makes contact at about t=6 msec. For about another 6 msec, the short power pin makes a complete electrical contact with the short power pin receiver such that current can flow through the short power pin rather than through MOSFET Q1. At t=12 msec, the short power pin loses contact due to mechanical bounce of the adaptor card during connector mating. The adaptor card voltage begins to drop and the hot-plug circuit, still making connection through the dedicated long power pin, recovers and again supplies current to the load. At t=18 msec, the short power pin has re-established electrical contact once again and is providing the total supply current to the adaptor card. At this time, the adaptor card is fully mated at its connectors and there is no further mechanical motion. Thus, waveform 54 remains quite constant from this point onwards.

On the other hand, waveform 52, with the same voltage scale as waveform 54, shows negligible disturbance during the adaptor card insertion process and throughout the whole time.

As has been described, the present disclosure describes a hot-plug plug circuit for minimizing or eliminating voltage dropouts and noise transients during the hot-plugging of a high-current load. The hot-plug circuit, under the present invention, works by detecting an initial connection of the load, such as an adaptor card, and then applies supply voltage and current in a gradual and controlled manner. The hot-plug circuit is relatively insensitive to any dynamic resistive change in the load. Without the hot-plug circuit, various digital devices within the system can cause dynamic load variations as power is brought up. Latches, gate, and drivers can power up in random states having different supply current requirements. The hot-plug circuit under the present invention can smoothly respond to sudden load changes during power-up, even to those induced by contact bounce during the insertion of an adaptor card.

While the disclosure has been particularly shown and described with reference to an illustrative embodiment, it will be understood by those skilled in the art that various changes in form and detail may be made therein without departing from the spirit and scope of the disclosure.

What is claimed is:

1. A hot-plug circuit comprising:
   an n-channel MOSFET connected between a power supply and an input, wherein said input is adapted to receive a high-current load, wherein said first terminal of said n-channel MOSFET is a drain and said second terminal of said n-channel MOSFET is a gate;
   a capacitor connected between a first terminal and a second terminal of said n-channel MOSFET;
   a first resistor connected to said second terminal of said n-channel MOSFET; and
   a control circuit means for applying a first bias voltage to said second terminal of said n-channel MOSFET via said first resistor in order to turn said n-channel MOSFET off during an absence of said high-current load, and for applying a second bias voltage to said second terminal of said n-channel MOSFET via said first resistor in order to turn said n-channel MOSFET on under a linear conduction mode upon an initial contact of said high-current load to said input, wherein voltage dropouts and noise transients are minimized.

2. The hot-plug circuit according to claim 1, wherein said control circuit means includes a second resistor, a third resistor, and a fourth resistor connected in series to form a voltage divider.

3. The hot-plug circuit according to claim 2, wherein said voltage divider includes a second transistor connected in parallel with said fourth resistor, wherein said first bias voltage is output when said second transistor is on while said second bias voltage is output when said second transistor is off.

4. The hot-plug circuit according to claim 3, wherein said second transistor is an npn transistor.

5. The hot-plug circuit according to claim 1, wherein said control circuit means is connected to a bias voltage, wherein said bias voltage is at least 10 volts higher than voltage from said power supply.

6. A hot-plug circuit comprising:
   an NFET having a drain connected between a power supply and a source coupled to an input, wherein said input is adapted to receive a high-current load;
   a capacitor connected between said drain and a gate of said NFET;
   a first resistor, a second resistor, and a third resistor connected in series between a bias voltage and said drain of said NFET;
   a fourth resistor coupled between a node situated between said first resistor and said second resistor and said gate of said NFET;
   an npn transistor having a collector coupled to a node between said second resistor and said third resistor and an emitter coupled to said power supply;
   a fifth resistor coupled between a base of said npn transistor and said bias supply; and
   a first diode and a second diode coupled in series between said base of said npn transistor and said input.

7. The hot-plug circuit according to claim 6, wherein said bias voltage is at least 10 volts higher than voltage from said power supply.

8. A computer system comprising:
   a processor;
   a power supply coupled to said processor; and
   at least one adaptor card slot coupled to said power supply, wherein said at least one adaptor card slot includes a hot-plug circuit comprising
   a first transistor connected between said power supply and an input, wherein said input is adapted to receive a high-current load;
   a capacitor connected between a first terminal and a second terminal of said first transistor;
   a first resistor connected to said second terminal of said first transistor; and
   a control circuit means for applying a first bias voltage to said second terminal of said first transistor via said first resistor in order to turn said first transistor off during an absence of said high-current load, and for applying a second bias voltage to said second terminal of said first transistor via said first resistor in order to turn said first transistor on under a linear conduction mode upon an initial contact of said high-current load to said input, wherein voltage dropouts and noise transients are minimized.

9. The computer system according to claim 8, wherein said first transistor within said at least one hot-plug circuit is an n-channel MOSFET.

10. The computer system according to claim 9, wherein said first terminal of said first transistor is a drain and said second terminal of said first transistor is a gate.

11. The computer system according to claim 8 wherein said control circuit means within said at least one hot-plug circuit includes a second resistor, a third resistor, and a fourth resistor connected in series to form a voltage divider.

12. The computer system according to claim 11, wherein said voltage divider includes a second transistor connected in parallel with said fourth resistor, wherein said first bias voltage is output when said second transistor is on while said second bias voltage is output when said second transistor is off.

13. The computer system according to claim 12, wherein said second transistor is an npn transistor.

14. The computer system according to claim 8, wherein said control circuit means within said at least one hot-plug circuit is connected to a bias voltage, wherein said bias voltage is at least 10 volts higher than voltage from said power supply.

* * * * *

UNITED STATES PATENT AND TRADEMARK OFFICE
CERTIFICATE OF CORRECTION

PATENT NO. : 5,898,844
DATED : Apr. 27, 1999
INVENTOR(S) : *Thompson*

It is certified that error appears in the above-identified patent and that said Letters Patent is hereby corrected as shown below:

Column 3, line 13, please delete "signal pin receivers 8" and insert instead --signal pin receivers 6--.

Signed and Sealed this

Eighth Day of February, 2000

*Attest:*

Q. TODD DICKINSON

*Attesting Officer*    *Commissioner of Patents and Trademarks*